(12) United States Patent
White (10) Patent No.: US 8,091,913 B1
(45) Date of Patent: Jan. 10, 2012

(54) VARIABLE ADJUSTABLE TRAILER HITCH

(76) Inventor: Donald M. White, Royal Palm Beach, FL (US)

(*) Notice: Subject to any disclaimer, the term of this patent is extended or adjusted under 35 U.S.C. 154(b) by 0 days.

(21) Appl. No.: 12/754,779

(22) Filed: Apr. 6, 2010

(51) Int. Cl.
B60D 1/44 (2006.01)
B60D 1/04 (2006.01)
(52) U.S. Cl. ............... 280/468; 280/467; 280/456.1; 280/506
(58) Field of Classification Search .......... 280/456.1, 280/465, 467, 468, 470, 506; 52/346, 347, 52/365; 403/80
See application file for complete search history.

(56) References Cited

U.S. PATENT DOCUMENTS

| | | | | |
|---|---|---|---|---|
| 1,362,857 A | * | 12/1920 | Engh | 280/470 |
| 1,405,916 A | * | 2/1922 | Heenan | 280/470 |
| 1,450,526 A | * | 4/1923 | Timmis | 280/470 |
| 3,178,203 A | | 4/1965 | Elliott | |
| 3,891,239 A | | 6/1975 | Leo et al. | |
| 4,060,255 A | | 11/1977 | Zimmerman | |
| 4,153,132 A | * | 5/1979 | Biedebach | 180/420 |
| 4,214,772 A | | 7/1980 | Carr et al. | |
| 5,182,956 A | * | 2/1993 | Woodall et al. | 74/18.2 |
| 5,429,382 A | * | 7/1995 | Duncan | 280/491.4 |
| 6,585,280 B1 | * | 7/2003 | Wiers | 280/468 |
| 6,634,666 B2 | | 10/2003 | Shilitz et al. | |
| 6,974,146 B2 | | 12/2005 | Abair | |
| 7,726,681 B2 | * | 6/2010 | McKendry | 280/506 |
| 2002/0020988 A1 | | 2/2002 | Kleb et al. | |
| 2003/0132605 A1 | | 7/2003 | Wiers | |

* cited by examiner

Primary Examiner — Joanne Silbermann
Assistant Examiner — Daniel Yeagley
(74) Attorney, Agent, or Firm — Albert Bordas, P.A.

(57) ABSTRACT

A variably adjustable trailer hitch assembly, comprising a horizontal tube assembly that is fixedly secured onto a vehicle. A journaling tube assembly is mounted upon and journals the horizontal tube assembly. A ball assembly is mounted onto the journaling tube assembly and receives a trailer's hitch ball coupler. Adjustable means laterally move the journaling tube assembly mounted upon the horizontal tube assembly. A torque equalizer assembly is fixed upon the journaling tube assembly.

20 Claims, 11 Drawing Sheets

VARIABLE ADJUSTABLE TRAILER HITCH

BACKGROUND OF THE INVENTION

1. Field of the Invention

The present invention relates to hitch assemblies, and more particularly, to trailer hitch assemblies that can be variably adjusted to receive a trailer thereon.

2. Description of the Related Art

Applicant believes that one of the closest references corresponds to U.S. Pat. No. 6,974,146 (B2) issued to Abair on Dec. 13, 2005 for an adjustable hitch and method of use. However, it differs from the present invention because only Applicant teaches torque distribution on outside corners of a horizontal tube assembly. Furthermore, Abair teaches an adjustable trailer hitch assembly and method of use that permits one person to controllably move the hitch within a plane of defined boundaries. The trailer hitch assembly includes one or more longitudinally extending assemblies for mounting under a vehicle, a cross-bracket assembly attached substantially perpendicularly with telescoping assemblies, a receiver portion slidable in said cross-bracket assembly, and a ballmount fixed with said receiver portion with a pin. Telescoping assemblies and cross-bracket assembly include control mechanisms, which may include motors and worm gear drives, to move the receiver portion longitudinally and latitudinally, respectively, thereby moving the ballmount and hitch ball within a predefined plane. An integral safety latch system is also provided.

Applicant believes that another reference corresponds to U.S. Pat. No. 6,634,666 (B2) issued to Shilitz, et al. on Oct. 21, 2003 for a remote control towing-hitch assembly. However, it differs from the present invention because only Applicant teaches torque distribution on outside corners of the horizontal tube assembly. Furthermore, Shilitz, et al. teaches an adjustable trailer hitch, which provides an operator, improved remote control of the lateral position of a trailer hitch, and simplifies the procedure of hooking a trailer to a tow vehicle. The trailer hitch comprises a hitch assembly (such as a ball receptacle) attached to a roller carriage, which moves from side-to-side along a bumper-like housing. The roller carriage engages a positioning screw, and an electric motor mounted in a sealed end cap powers the positioning screw. Rotation of the screw translates into rightward or leftward lateral movement of the roller carriage and consequently of the ball receptacle assembly. Motion of the ball receptacle assembly is controlled via a wireless remote control unit. Such direct control over the precise lateral position of the trailer hitch enables the operator to accurately steer the trailer when traveling in reverse. During hook-up, lateral movement of the hitch enables the operator to connect the trailer and the tow vehicle from a greater range of positions, and eliminates the need for absolute accuracy of alignment between the tongue of the trailer and the hitch of the tow vehicle as required by traditional fixed hitches.

Applicant believes that another reference corresponds to U.S. Patent Application Publication No. 2003-0132605 (A1), published on Jul. 17, 2003 to Wiers for an adjustable hitch assembly for towing trailers. However, it differs from the present invention because only Applicant teaches torque distribution on outside corners of the horizontal tube assembly. Furthermore, Wiers teaches an adjustable hitch assembly is mounted on a towing vehicle and is adapted to move the hitch transversely, horizontally and vertically with respect to the towing vehicle. A first traveler is provided in a horizontally disposed C-shaped channel and is selectively movable along the channel with a rotatably driven threaded rod. A vertical C-shaped channel is mounted to the first traveler. A second traveler is provided in the vertical channel and is selectively movable along the vertical channel with a threaded rod extending longitudinally in the vertical channel. A hitch is mounted to the vertical channel traveler and is adapted for connecting to a trailer.

Applicant believes that another reference corresponds to U.S. Pat. No. 4,060,255 (B1) issued to Zimmerman on Nov. 29, 1977 for a wide range bumper mounted hitch. However, it differs from the present invention because only Applicant teaches torque distribution on outside corners of the horizontal tube assembly. Furthermore, Zimmerman teaches an elongated horizontal base member is provided for mounting in transverse position on one end of a towing vehicle. A pair of horizontal support arms have a first pair of corresponding ends thereof mounted on the base member, at points spaced therealong, for shifting along the base member and swinging relative to the base member about upstanding axes shiftable along the base member with the first pair of arm ends between first outwardly convergent positions and second substantially aligned positions generally paralleling the base member with the first pair of arm ends disposed remote from each other and the second other pair of arm ends disposed adjacent each other. A hitch member is provided to which the second other pair of ends of the arms are pivotally secured for angular displacement about upstanding axes and the hitch member and the base member include coacting releasable lock structure operative to lock the hitch member in position relative to the base member when the arms are disposed in the second positions thereof. Further, the base member and the first pair of ends of the arms include coacting structure whereby the arms and the hitch member supported from the second pair of arm ends will be automatically positioned, along the base member, in predetermined position when the arms are swung from the first positions thereof to the second positions thereof.

Applicant believes that another reference corresponds to U.S. Pat. No. 3,891,239 (B1) issued to Leo, et al. on Jun. 24, 1975 for a hydraulically operated hitch for towing and positioning mobile homes. However, it differs from the present invention because only Applicant teaches torque distribution on outside corners of the horizontal tube assembly. Furthermore, Leo, et al. teaches a tractor truck is provided with a pivoting frame extending from the rear, and having a hitching ball mounted thereon and laterally shiftable by a hydraulic actuator. The frame itself is movable up or down about a horizontal axis, by a hydraulic actuator, to move the hitching ball up or down. Locking pins are provided to unload the actuator cylinders during over-the-road operation.

Applicant believes that another reference corresponds to U.S. Pat. No. 3,178,203 (B1) issued to Elliott on Apr. 13, 1965 for a tandem trailer steering mechanism. However, it differs from the present invention because only Applicant teaches torque distribution on outside corners of the horizontal tube assembly. Furthermore, Elliott teaches, in a movable drawbar for a towing vehicle, a housing adapted to be secured transversely across the rear of the frame of a leading vehicle. The housing including end walls, top and bottom walls, a front wall and a rear wall. The top and bottom walls having longitudinal slots therein, a bearing box movably mounted on the housing and the bearing box including a rearwardly disposed plate, means on the plate for connecting a trailing vehicle thereto, a block arranged in the housing and the block having an internally threaded bore therethrough, vertically disposed shaft members extending through the slots in the top and bottom walls and connecting to the box and block, a threaded shaft journaled in the end walls and having its extremities extending therethrough, the shaft extending through the threaded bore, a sprocket on an end of the shaft, a reversible electric motor operatively connected to the sprocket, remotely positioned switch means for selectively actuating the motor in either direction, axles connected to the box, guide rollers on the axles engaging the front and rear walls of the housing insuring alignment of the box during longitudinal travel along the housing occasioned by rotation of the threaded shaft, and brake means for retarding rotation of the threaded shaft on the other end of the shaft from the sprocket.

Applicant believes that another reference corresponds to U.S. Pat. No. 4,214,772 (B1) issued to Carr, et al. on Jul. 29, 1980 for laterally adjustable trailer hitch system. However, it differs from the present invention because only Applicant teaches torque distribution on outside corners of the horizontal tube assembly. Furthermore, Carr, et al. teaches a trailer hitch system (10) having longitudinal hitch ball movement whereby a trailer tows point can be laterally adjusted. The longitudinal hitch ball movement is facilitated by a screw shaft (20) housed in the trailer hitch system (10) and readily accessible from either side of the trailer hitch system (10). The trailer hitch system (10) may accommodate multiple hitch balls (22, 23) and allows any one of the hitch balls (22, 23) to be selectively centered on a bumper (82) of a towing vehicle. Hitch balls (22, 23) of diverse sizes may be interchanged while the trailer hitch system (10) is installed on the towing vehicle. The trailer hitch system (10) may be adapted to any type of towing vehicle. An adaptor (110) allows attachment of other types of hitches, which are also laterally adjustable therewith.

Applicant believes that another reference corresponds to U.S. Patent Application Publication No. US 2002-0020988 (A1), published on Feb. 21, 2002 to Kleb, et al. for a trailer coupling. However, it differs from the present invention because only Applicant teaches torque distribution on outside corners of the horizontal tube assembly. Furthermore, Kleb, et al. teaches a trailer coupling for motor vehicles comprising a pivot bearing body which is rigidly attached to the vehicle and upon which there is mounted a pivotal element that is pivotal about a pivotal axis, a ball neck which extends outwardly from the pivotal element and carries a coupling ball at the end thereof remote from the pivotal element, and a locking device for fixing the pivotal element relative to the pivot bearing body in interlocking manner, so that the locking device is constructed in as simple a manner as possible and can be implemented in simple manner so that it is free of play, it is proposed that the pivotal element is mounted on the pivot bearing body such that it is displaceable along the pivotal axis thereof and that by displacement of the pivotal element along the pivotal axis the pivotal element is moveable into a position wherein it is pivotal relative to the pivot bearing body and into a position wherein it is fixed relative to the pivot bearing body in mutually non-rotatable manner by means of interlocking arrangement.

Other patents describing the closest subject matter provide for a number of more or less complicated features that fail to solve the problem in an efficient and economical way. None of these patents suggest the novel features of the present invention.

SUMMARY OF THE INVENTION

The instant invention is a variably adjustable trailer hitch assembly, comprising a horizontal tube assembly fixedly secured onto a vehicle. A journaling tube assembly is mounted upon and journals the horizontal tube assembly. A ball assembly is mounted onto the journaling tube assembly. The ball assembly receives a trailer's hitch ball coupler. Adjustable means laterally move the journaling tube assembly mounted upon the horizontal tube assembly. A torque equalizer assembly is fixed upon the journaling tube assembly.

The horizontal tube assembly comprises a threaded power transfer rod extending therethrough and from the adjustable means to laterally move the journaling tube assembly mounted upon the horizontal tube assembly. The journaling tube assembly comprises a threaded internal horizontal tube that receives and cooperates with the threaded power transfer rod to allow the journaling tube assembly to journal upon the horizontal tube assembly when activated by the adjustable means. The torque equalizer assembly has equalizing means to keep each interior wall of the journaling tube assembly at an approximate equivalent distance to a respective exterior wall of the horizontal tube assembly.

The horizontal tube assembly comprises first and second ends and an elongated horizontal channel extended between the first and second ends. The journaling tube assembly further comprises a power transfer bolt bolted through the horizontal tube assembly, the journaling tube assembly, and the threaded internal horizontal tube. The power transfer bolt journals within the elongated horizontal channel extended between the first and second ends when the journaling tube assembly journals upon the horizontal tube assembly.

The journaling tube assembly comprises at least one center plunger hole. The journaling tube assembly further comprises at least one center plunger that aligns with and fills the at least one center plunger hole when the journaling tube assembly is centrally positioned on the horizontal tube assembly. The journaling tube assembly further comprises a housing mounted thereon, the housing is approximately perpendicular to the horizontal tube assembly. The housing houses at least one elongation tube that attaches to the ball assembly. The elongation tube has positioning means to position the ball assembly at a desired distance from the housing. The housing comprises at least one center plunger hole. The housing further comprises at least one center plunger that aligns with and fills the at least one center plunger hole when the ball assembly is at the desired distance from the housing. The horizontal tube assembly comprises bellows on each side of the journaling tube assembly. The horizontal tube assembly is mounted onto the vehicle with a frame bracket. The ball assembly mounts onto the at least one elongation tube.

The adjustable means to laterally move the journaling tube assembly mounted upon the horizontal tube assembly comprises a motor assembly having a motor with rotating means to rotate the threaded power transfer rod clockwise and counter-clockwise. The adjustable means to laterally move the journaling tube assembly mounted upon the horizontal tube assembly may instead comprise a manual crank assembly to rotate the threaded power transfer rod clockwise and counter-clockwise.

The torque equalizer assembly comprises adjustable torque equalizers, each of the adjustable torque equalizers has a threaded end cap that places a predetermined force upon its respective thrust insert housed therein to adjust and keep each interior wall of the journaling tube assembly at the approximate equivalent distance to its respective exterior wall of the horizontal tube assembly.

In a first alternate embodiment, the torque equalizer assembly comprises stationary welded torque equalizers that place a predetermined force to keep each interior wall of the journaling tube assembly at the approximate equivalent distance to its respective exterior wall of the horizontal tube assembly.

In a second alternate embodiment, the torque equalizer assembly has torque spacers positioned in between each interior wall of the journaling tube assembly and each respective exterior wall of the horizontal tube assembly to keep each interior wall of the journaling tube assembly at the approximate equivalent distance to its respective exterior wall of horizontal tube assembly.

It is therefore one of the main objects of the present invention to provide a variably adjustable trailer hitch that can be connected to a trailer without the assistance of a second person.

It is another object of this invention to provide a variably adjustable trailer hitch having means to laterally move a hitch ball to facilitate engagement of a trailer.

It is another object of this invention to provide a variably adjustable trailer hitch, whereby said means to laterally move the hitch ball is electrical and/or mechanical.

It is another object of this invention to provide a variably adjustable trailer hitch comprising a threaded rod, which rotates in two directions to further facilitate engagement of the trailer.

It is another object of this invention to provide a variably adjustable trailer hitch that is of a durable and reliable construction.

It is another object of this invention to provide a variably adjustable trailer hitch that may be installed without obstructing the spare tire storage located below the tow vehicle.

It is yet another object of this invention to provide such an apparatus that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is generally referred to with numeral 10. It can be observed that it basically includes horizontal tube assembly 20, journaling tube assembly 80, ball assembly 180, motor assembly 260, and torque equalizer assembly 320.

Figure 1:
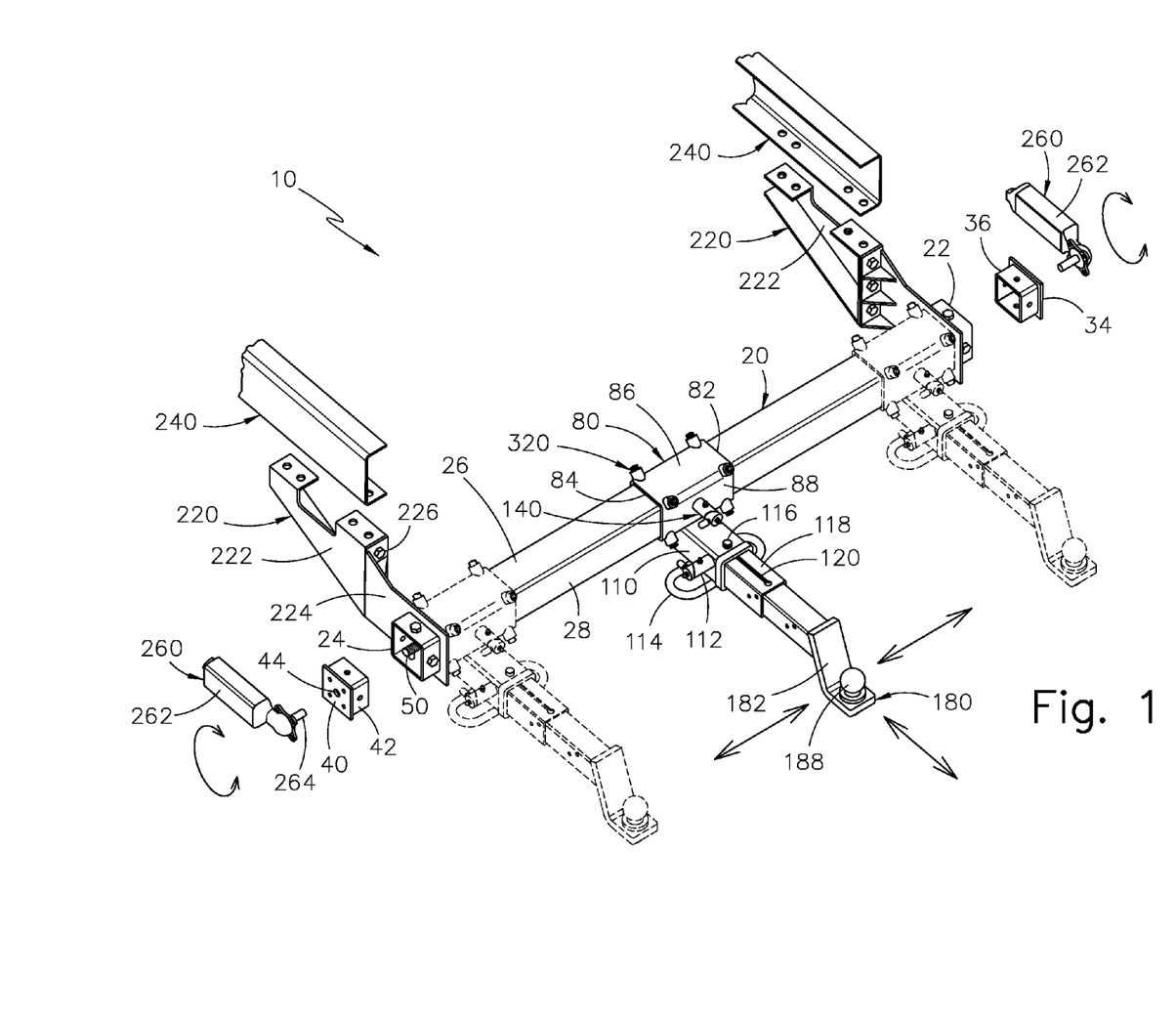
FIG. 1 is an isometric view of a preferred embodiment of the instant invention.

Instant invention 10 is mounted upon any vehicle capable of towing a trailer assembly. As seen in FIG. 1, any such vehicle will comprise a frame section such as tow vehicle frame 240. Tow vehicle frame 240 has sufficient material strength and durability to tow a trailer assembly carrying a load with instant invention 10. Mounting onto tow vehicle frame 240 are at least two frame bracket assemblies 220. Each frame bracket assembly 220 comprises mounting frames 222. Mounting frames 222 each having connecting brackets 224 that are bolted thereon by bolts 226 or the like. Frame bracket assembly 220 is vertically adjustable to facilitate ease of initial installation for horizontal tube assembly 20.

Connecting brackets 224 are designed to receive ends 22 and 24 of horizontal tube assembly 20, and is noted that connecting brackets 224 are each at a predetermined distance from ends 22 and 24. It is noted that connecting brackets 224 are adjustable to facilitate ease of initial installation to different sized towing vehicles. Capping end 22 is end tube plate 34 having end tube 36. End tube 36 snuggly fits within end 22. As better seen in FIG. 2, end tube 36 comprises hole 38 with washer 56 biased thereon to eliminate thrust on motor assembly 260 and its parts. Similarly, capping end 24 is end tube plate 40 having end tube 42. End tube 42, having hole 44 snuggly fits within end 24. Mounted onto each end tube plates 34 and 40 are motor assemblies 260. Motor assemblies 260 comprise motors 262.

Figure 2:
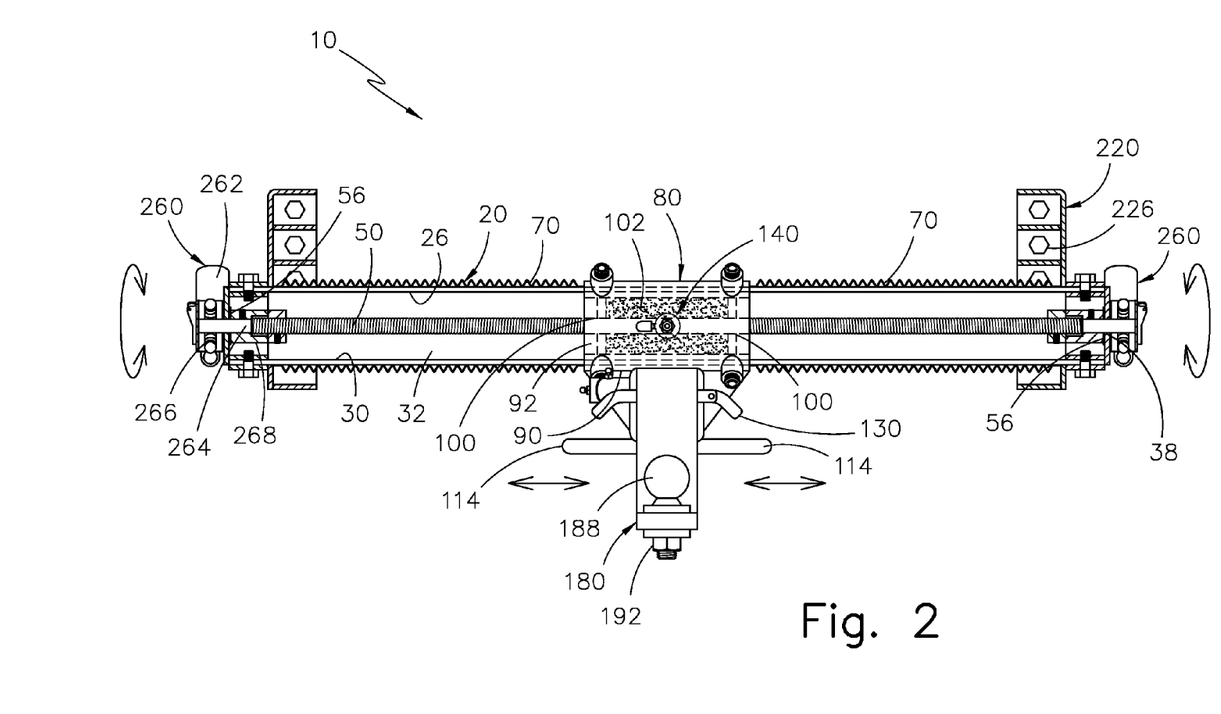
FIG. 2 is a front elevational view of the preferred embodiment of the instant invention seen in FIG. 1, wherein a horizontal tube assembly has been cross sectioned.

As further illustrated in FIGS. 1 and 2, horizontal tube assembly 20 is elongated and squarely shaped, comprising top wall 26, front wall 28, bottom wall 30, and rear wall 32. Although not illustrated, it is noted that horizontal tube assembly 20 may comprise drain holes on bottom wall 30 in the event any water were to enter therein.

Journaling tube assembly 80 is mounted upon and journals horizontal tube assembly 20. Journaling tube assembly 80 comprises ends 82 and 84, and top, front, bottom, and rear walls 86, 88, 90 and 92 respectively. In addition, journaling tube assembly 80 comprises threaded internal horizontal tube 100 that receives and cooperates with threaded power transfer rod 50 to allow journaling tube assembly 80 to journal upon horizontal tube assembly 20 when activated by adjustable means. Housed within journaling tube assembly 80 is lubricant 102. Lubricant can be any such as grease. Journaling tube assembly 80 further comprises housing 110 mounted thereon, and removably secured onto housing 110 is ball assembly 180. Ball assembly 180 receives a trailer's hitch ball coupler of the trailer assembly, not shown.

Threaded power transfer rod 50 laterally moves journaling tube assembly 80 mounted upon horizontal tube assembly 20 into any of the two extreme positions represented in broken lines or any intermediate position therebetween. Motor assemblies 260 define the adjustable means to laterally move journaling tube assembly 80. Specifically, in the preferred embodiment, adjustable means comprises motor assembly 260 mounted upon horizontal tube assembly 20. Motor assembly 260 has motor 262 with rotating means to rotate threaded power transfer rod 50 clockwise and counter-clockwise. The rotating means further comprises shaft 264, worm gear 266 and flexible coupling 268.

Figure 3:
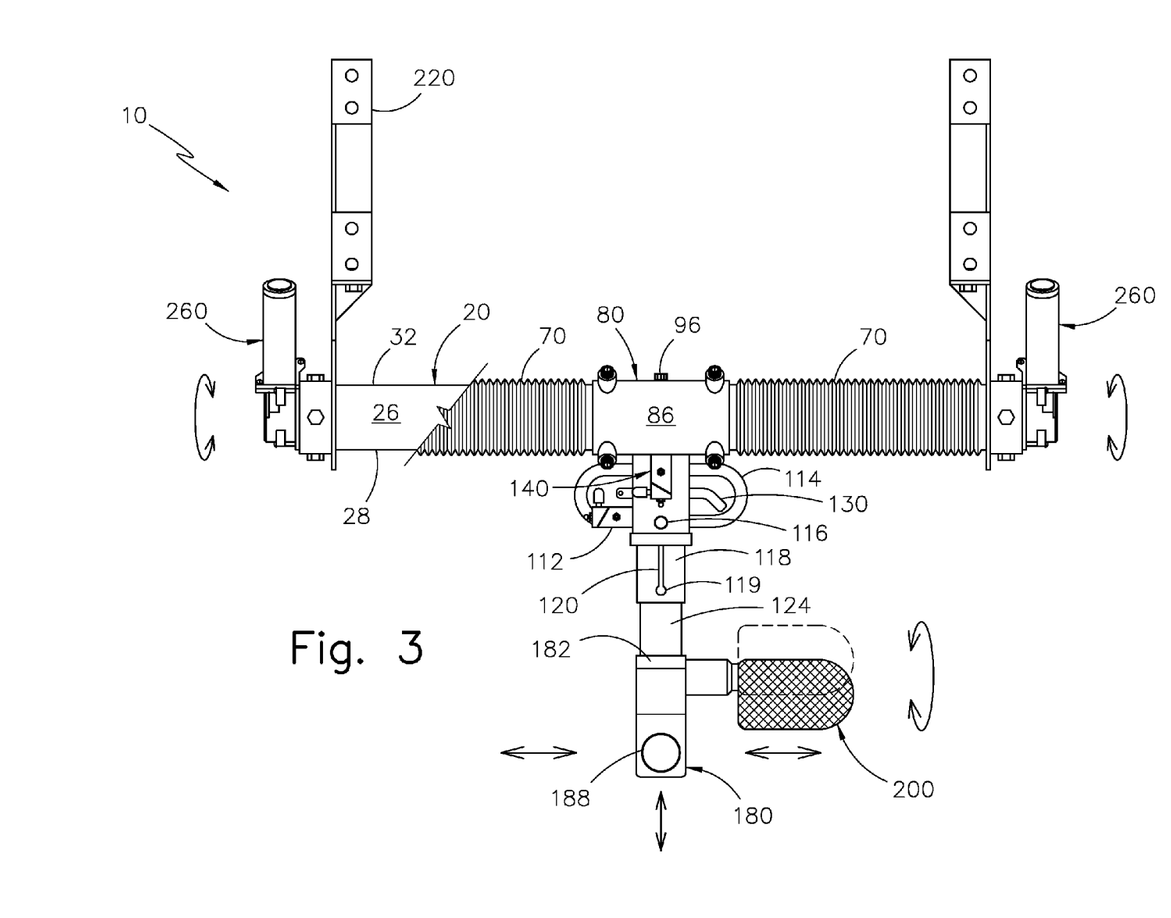
FIG. 3 is a top plan view of the preferred embodiment of the instant invention seen in FIG. 1, further comprising bellows, wherein a section of bellows has been removed for illustrative purposes.
Figures 4, 5:
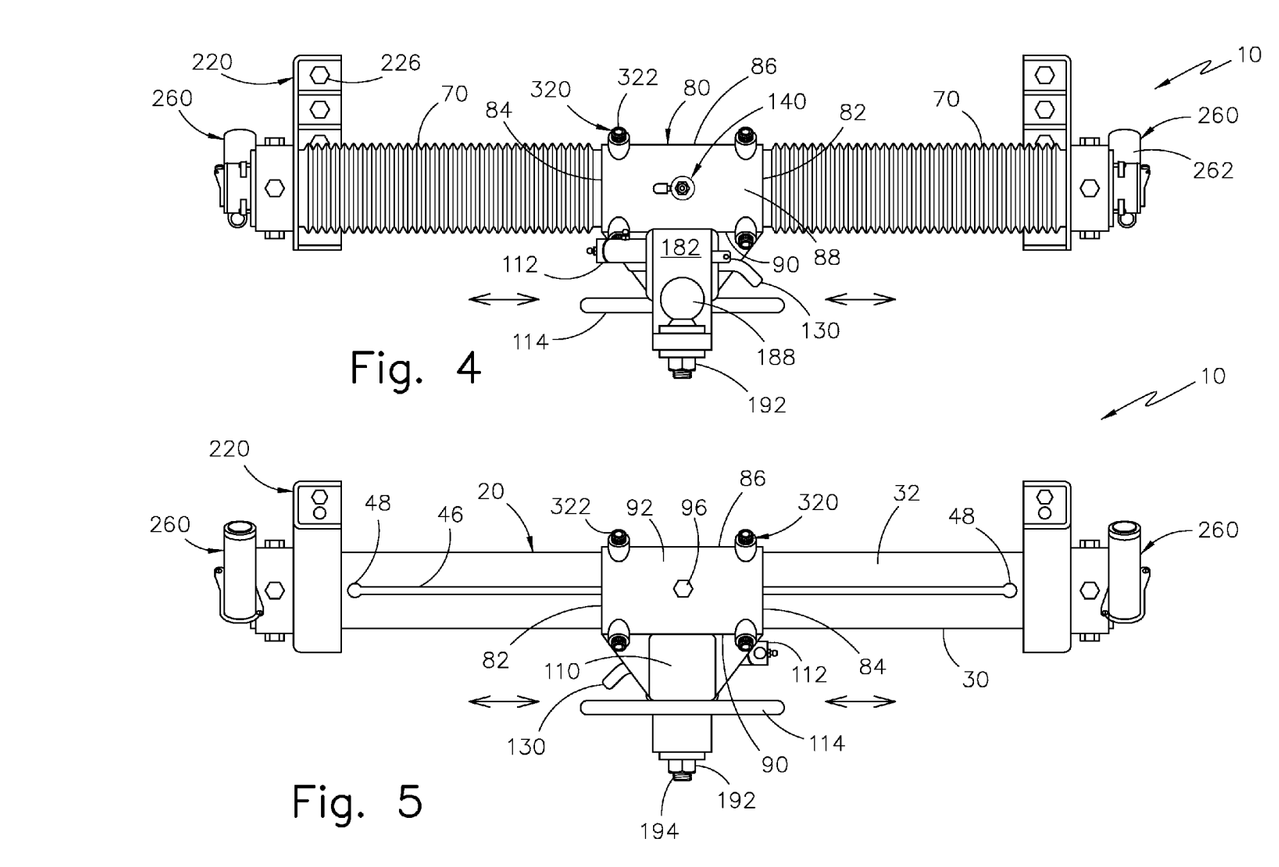
FIG. 4 is a front elevational view of the preferred embodiment of the instant invention seen in FIG. 1.
FIG. 5 is a rear elevational view of the preferred embodiment of the instant invention seen in FIG. 1.

As seen in FIG. 3, optionally, step 200 may be mounted to ball assembly 180. As seen in FIGS. 3, 4 and 5, horizontal tube assembly 20 also comprises bellows 70 on each side of journaling tube assembly 80. As best seen in FIG. 5, elongated horizontal channel 46, on rear wall 32, terminates at end holes 48. Bellows operate to prevent contamination within horizontal tube assembly 20 and threaded power transfer rod 50. Such contamination as an example may enter through elongated horizontal channel 46.

As seen in FIGS. 3, 4, 5, and 6, journaling tube assembly 80 comprises housing 110 mounted thereon. Housing 110 comprises at least one center plunger assembly 140 and at least one center plunger hole 106, best seen in FIGS. 10A, 10B, and 10C. Center plunger assembly 140 aligns with and fills center plunger hole 106 and center hole 52 of horizontal tube assembly when journaling tube assembly 80 is centrally positioned on horizontal tube assembly 20. Elongation tubes 118 and 124 are telescopically mounted to housing 110. Elongation tube 118 has first positioning means to position ball assembly 180 at a desired distance from housing 110. The first positioning means is defined by locking plunger 112, safety-locking pin 130, and guide bolt 116. Locking plunger 112 fills plunger hole 122 of elongation tube 118 when cooperatively aligned. Elongation tube 124 has second positioning means to position ball assembly 180 at a desired distance from housing 110. The second positioning means is defined by locking plunger 112 and safety-locking pin 130, whereby locking plunger 112 fills plunger holes 122 of elongation tube 118 and of elongation tube 118 when cooperatively aligned. A security pin, such as safety-locking pin 130 may fill pin holes 126 laterally disposed on housing 110 and elongation tubes 118 and 124, respectively when cooperatively aligned. Elongation tube 118 has channel 120, best seen in FIG. 3. Guide bolt 116, mounted to the top wall of housing 110, journals within channel 120 to guide elongation tube 118 within housing 110. Housing 110 may also comprise fastening loops 114 for securing security chains from the trailer assembly, not shown.

Figure 6:
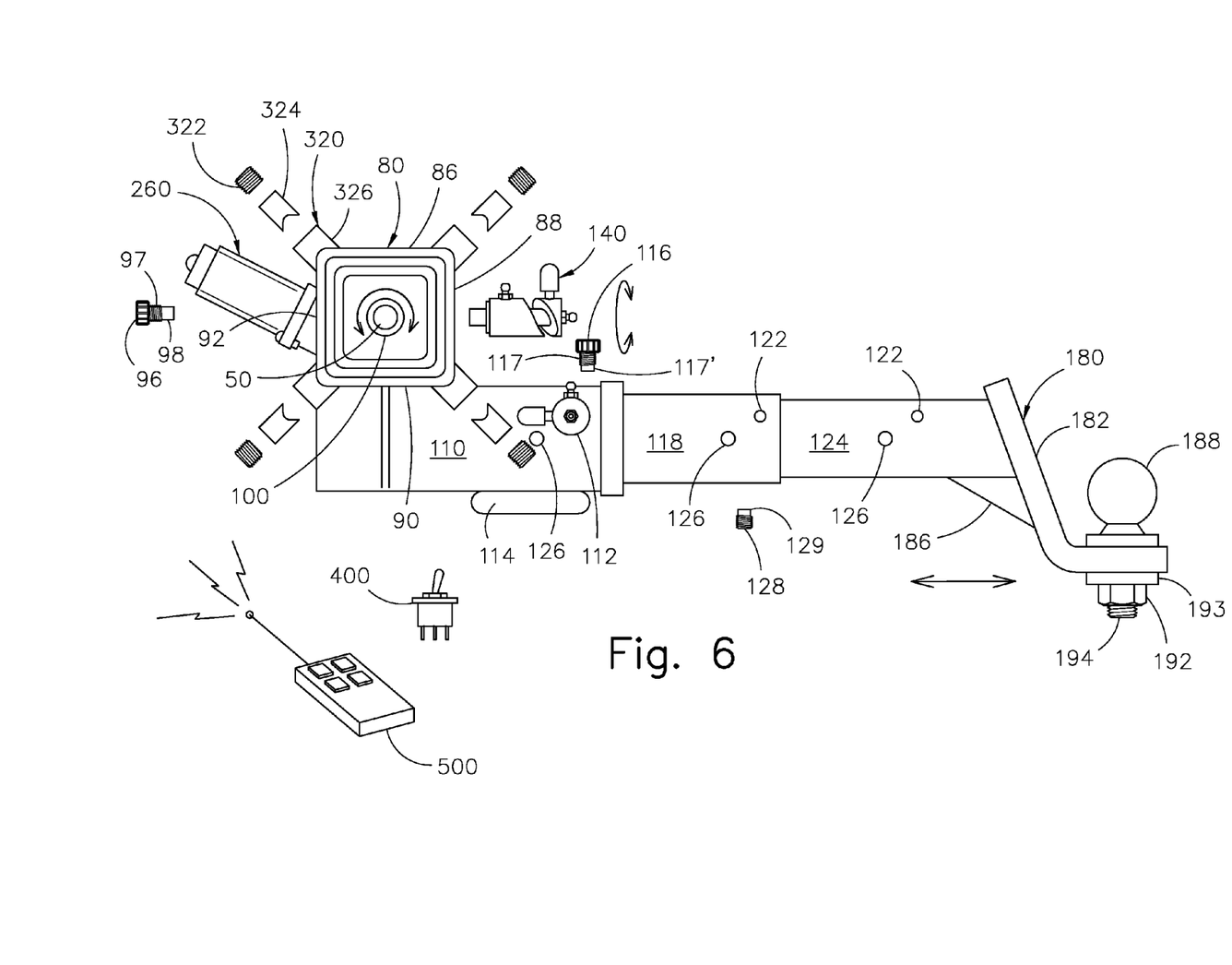
FIG. 6 is a side view of the preferred embodiment of the instant invention seen in FIG. 1 partially exploded.

Ball assembly 180 comprises bracket 182. Bracket 182 has a substantially inclined L-shape. Trailer ball 188 mounts onto a base of bracket 182. Trailer ball 188 has threads 194 and it is secured to bracket 182 with lock washer 190 and fastening nut 192. Gusset 186 further strengthens bracket 182 onto elongation tube 124.

As seen in FIG. 6, instant invention 10 may also comprise switch 400 and/or remote control 500 to operate motor assembly 260. As best seen in this illustration, power transfer bolt 96 comprises a threaded section 97 and step-down shank 98.

In operation, power transfer bolt 96 may only be inserted or extracted through end holes 48 seen in FIG. 5, whereby power transfer bolt 96 is flat on a top and bottom of step-down shank 98 and round on threaded section 97. This prevents power transfer bolt 96 from unloosening when traveling within elongated horizontal channel 46. In addition, guide bolt 116 comprises a threaded section 117 and step-down shank 117'. In operation, guide bolt 116 may only be inserted or extracted through end hole 119 seen in FIG. 3, whereby guide bolt 116 is flat on a top and bottom of step-down shank 117' and round on threaded section 117. This prevents guide bolt 116 from unloosening when traveling within channel 120. Guide bolt 116 also functions to prevent elongation tube 118 from being fully extracted from housing 110. In addition, headless guide bolt 128 comprises a threaded step-down shank 129. In operation, headless guide bolt 128 may only be inserted or extracted through an end hole, not seen, whereby headless guide bolt 128 is flat on a top and bottom of step-down shank 129. This prevents headless guide bolt 128 from unloosening when traveling within its respective channel, not seen. Headless guide bolt 128 also functions to prevent elongation tube 124 from being fully extracted from elongation tube 118.

Figure 7:
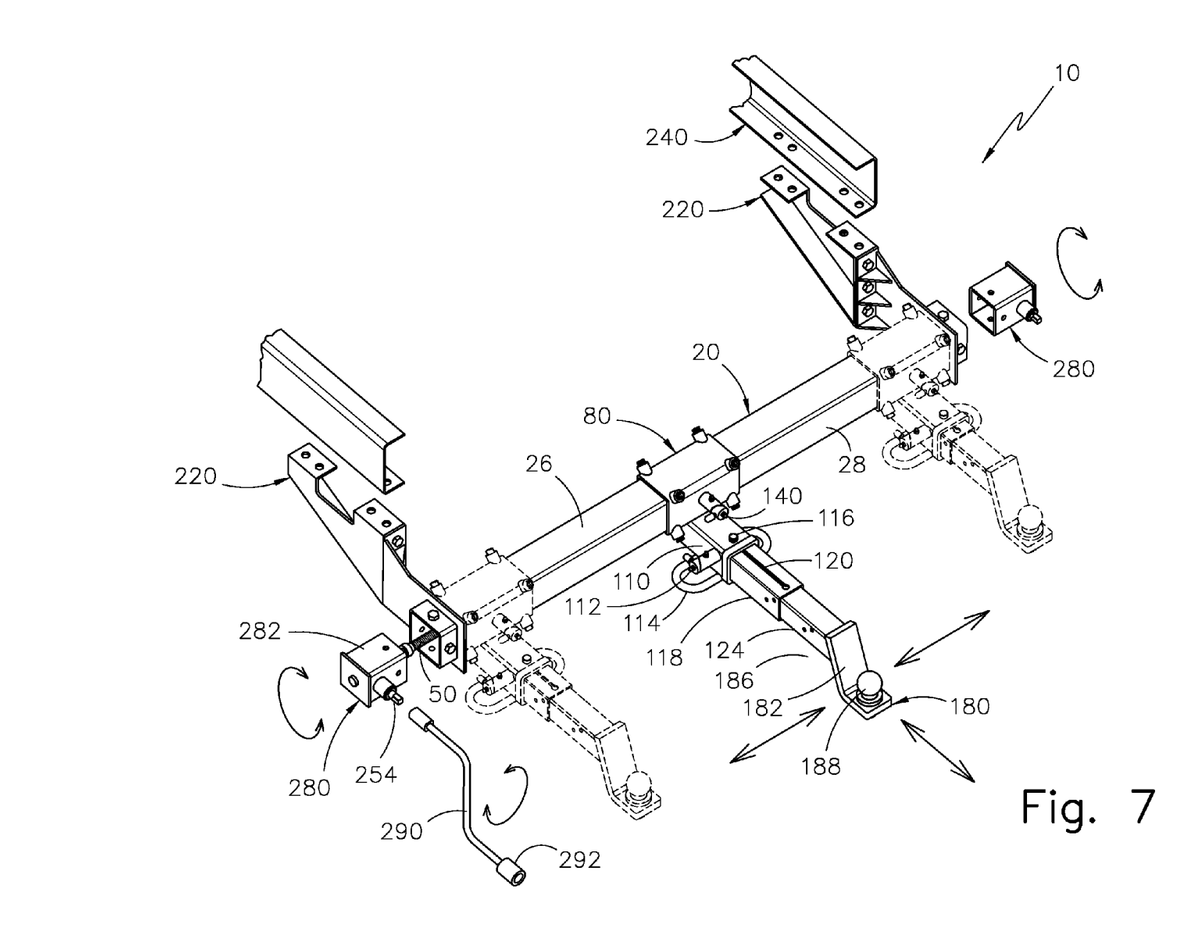
FIG. 7 is an isometric view of an alternate embodiment of the instant invention.
Figure 8:
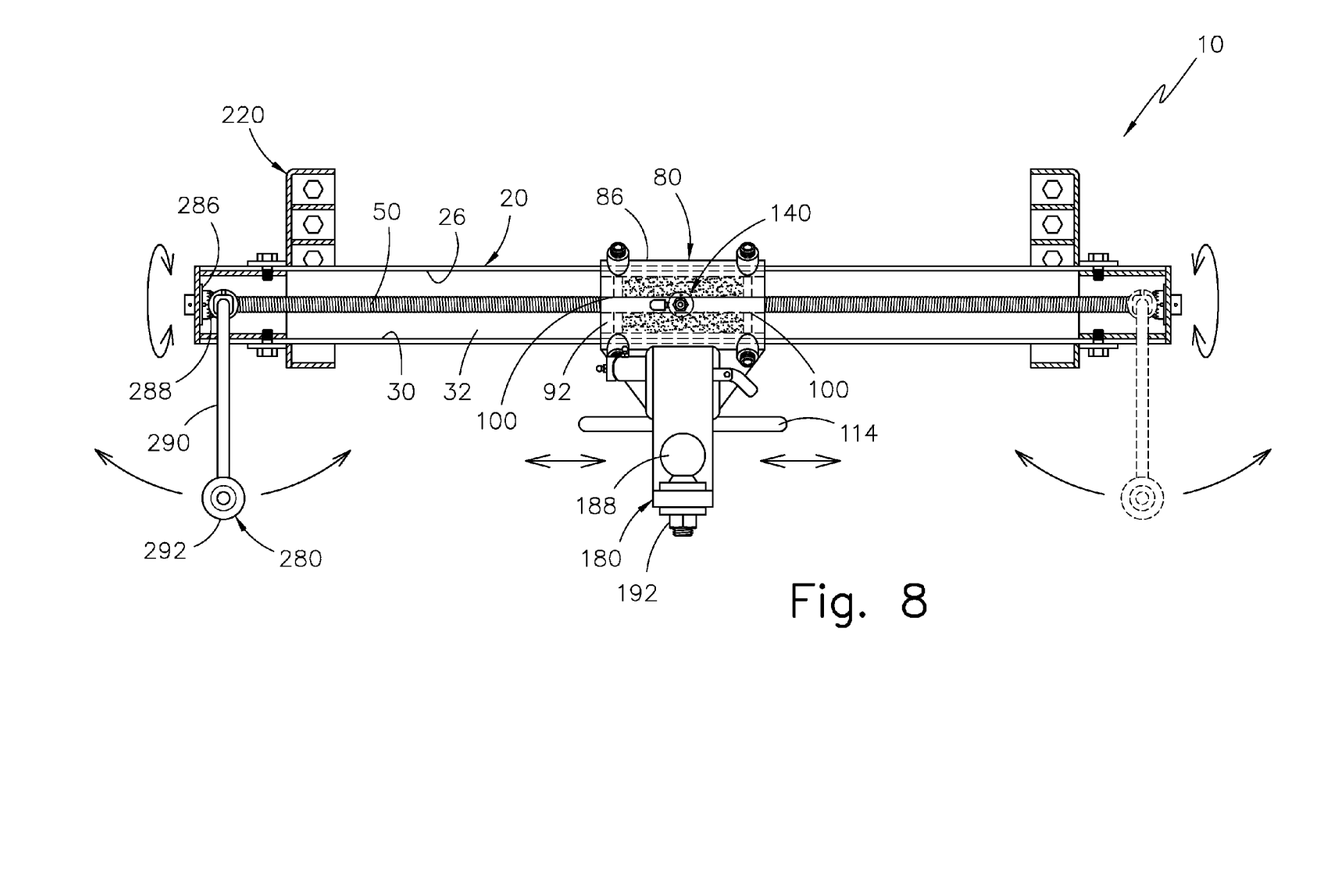
FIG. 8 is a front elevational view of the alternate embodiment of the instant invention seen in FIG. 7, wherein a horizontal tube assembly has been cross sectioned.

As seen in FIGS. 7 and 8, alternatively mounted onto each of end tube plates 34 and 40 are crank assemblies 280. Crank assemblies 280 comprise housing 282, shaft 284, thrust washer 286, gears 288, gear crank 290 and knob 292.

Threaded power transfer rod 50 laterally moves journaling tube assembly 80 mounted upon horizontal tube assembly 20 into any of the two extreme positions represented in broken lines or any intermediate position therebetween. Crank assemblies 280 define another adjustable means to laterally move journaling tube assembly 80. Specifically, in the preferred, adjustable means comprise crank assemblies 280 mounted upon horizontal tube assembly 20. A crank assembly 280 has gear crank 290 with rotating means to rotate threaded power transfer rod 50 clockwise and counter-clockwise. The rotating means further comprises housing 282, shaft 284, thrust washer 286, gears 288, gear crank 290 and knob 292. It is noted that tools, such as a hand-held direct current electric drill, can also be used as other adjustable means to laterally move journaling tube assembly 80 to rotate threaded power transfer rod 50 clockwise and counter-clockwise.

Figure 9:
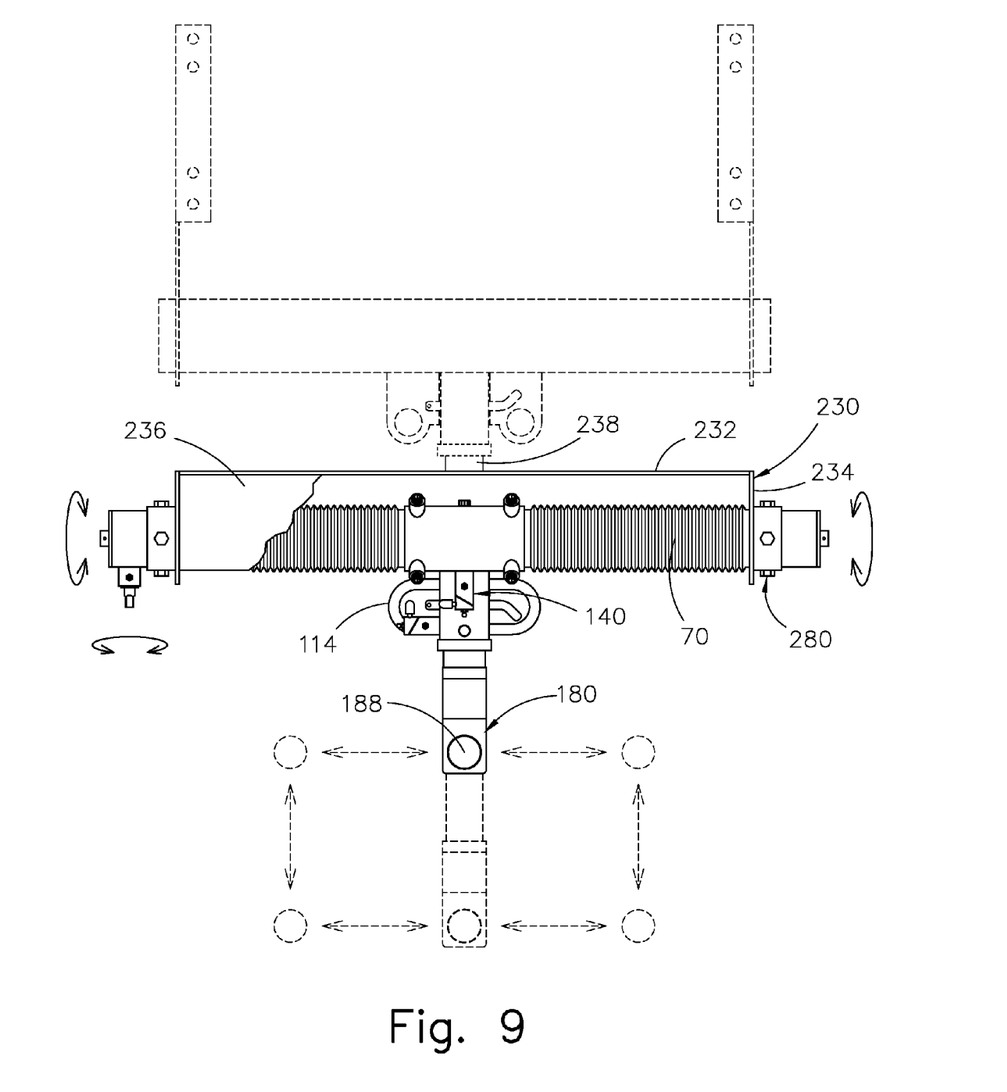
FIG. 9 is a top plan view of an alternate frame bracket assembly.

Seen in FIG. 9 is an alternate frame bracket assembly. Specifically, instead of tow vehicle frame 240 and at least two frame bracket assemblies 220 being used to permanently mount instant invention 10 onto the vehicle, removable frame bracket assembly 230 is utilized. Removable frame bracket assembly 230 comprises rear wall 232, lateral walls 234, top wall 236, and mounting tube 238. Removable frame bracket assembly 230 is constructed of a durable material such as steel and is designed to receive ends 22 and 24 of horizontal tube assembly 20. Mounting tube 238 inserts into any standard receiver tube of the vehicle capable of towing the trailer assembly. It is noted that the receiver tube can be one previously mounted by others onto the vehicle and/or can be previously installed standard equipment of the vehicle.

Figure 10A:
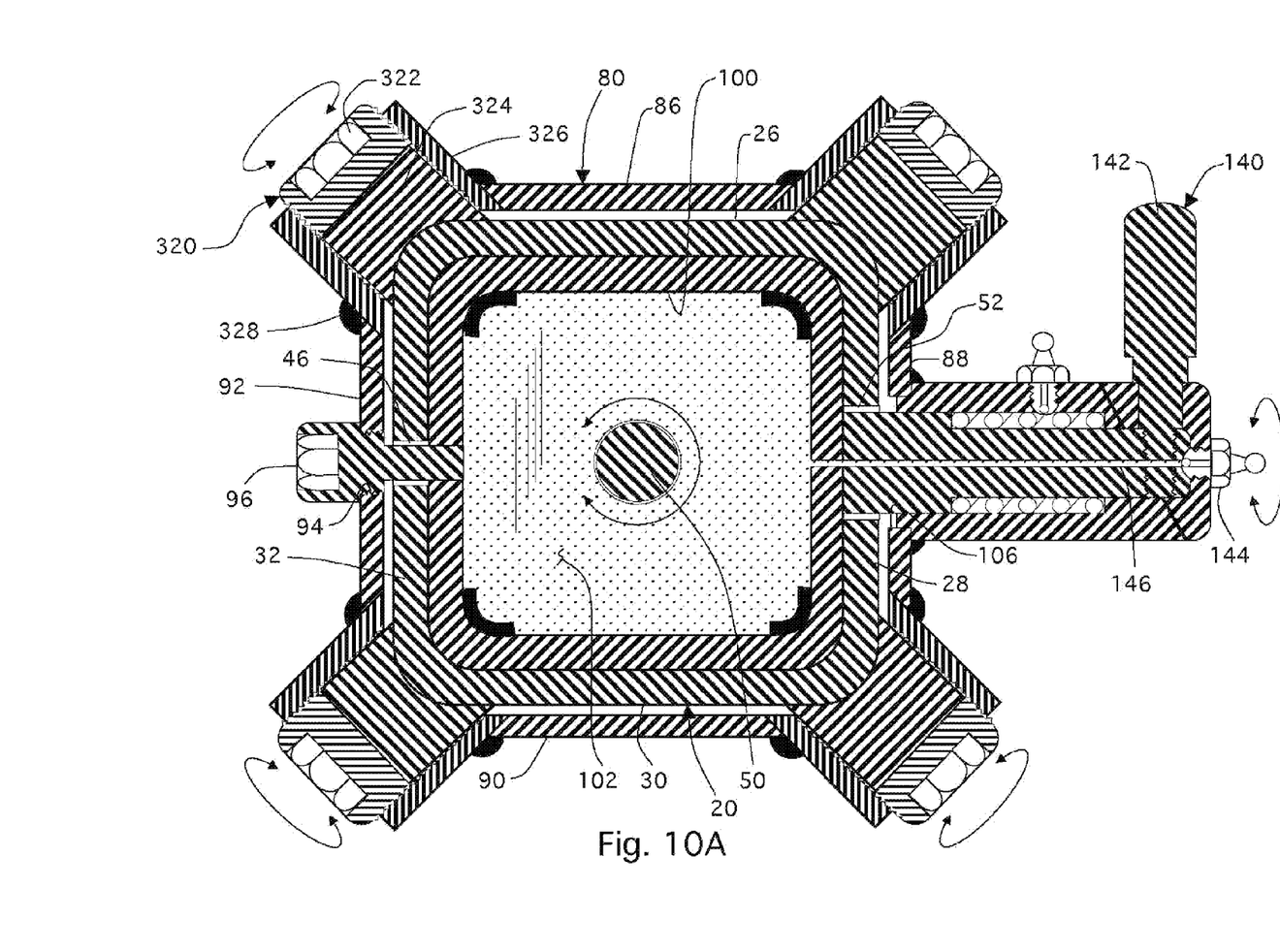
FIG. 10A is a cross-section view of a journaling and horizontal tube assembly having a preferred embodiment torque equalizer assembly.

As seen in FIG. 10A, torque equalizer assembly 320 has equalizing means to adjust and keep each interior face of journaling tube assembly 80 at an approximate equivalent distance to a respective exterior face of horizontal tube assembly 20. Torque equalizer assembly 320 comprises torque equalizers 326 fixedly mounted to journaling tube assembly 80. Each of torque equalizers 326 has a threaded end cap 322 that places a predetermined force upon its respective thrust insert 324 housed therein. Weld 328 keeps adjustable torque equalizers 326 rigidly mounted to journaling tube assembly 80. Torque equalizer assembly 320 allows for torque distribution on the outside corners of horizontal tube assembly 20.

Figure 10B:
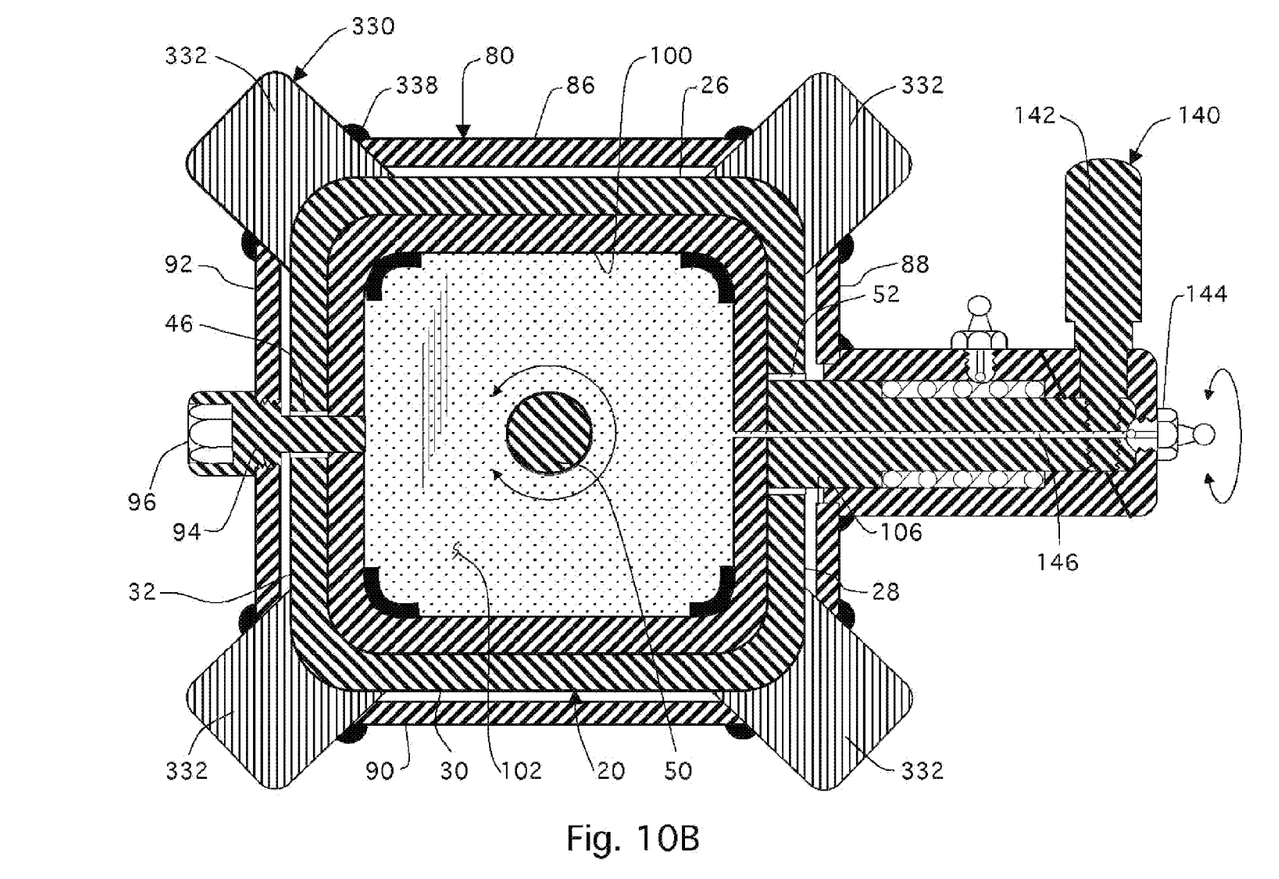
FIG. 10B is a cross-section view of the journaling and horizontal tube assembly having a first alternate embodiment torque equalizer assembly.

Seen in FIG. 10B is an alternate embodiment for torque equalizer assembly 320. Torque equalizer assembly 330 consists of stationary welded torque equalizer 332 fixedly mounted to journaling tube assembly 80 with welds 338. The cooperative shape of stationary welded torque equalizer 332 place a predetermined force upon the corners of horizontal tube assembly 20, thus keeping each interior face of journaling tube assembly 80 at an approximate equivalent distance to a respective exterior face of horizontal tube assembly 20. Torque equalizer assembly 330 also allows for torque distribution on the outside corners of horizontal tube assembly 20.

Figure 10C:
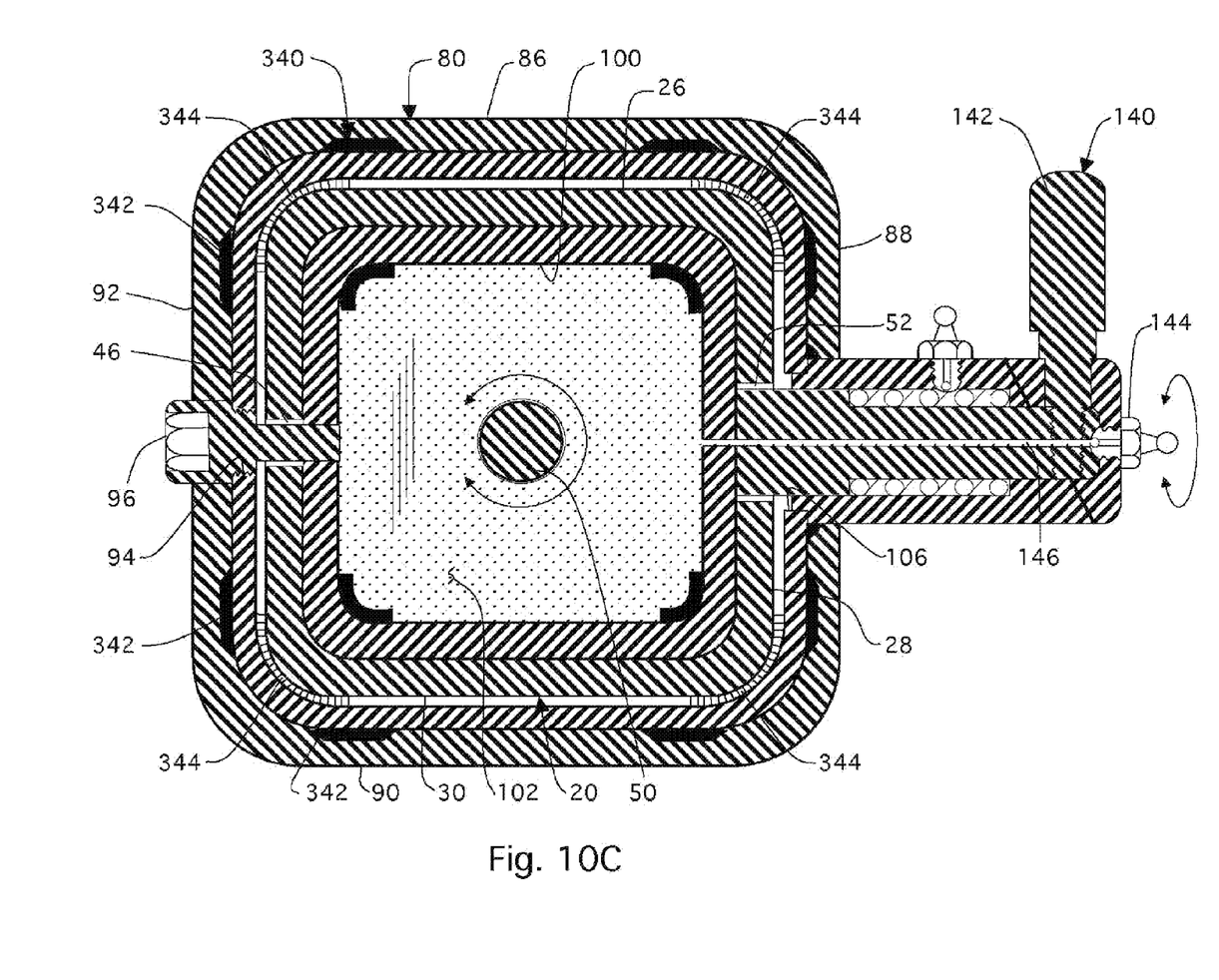
FIG. 10C is a cross-section view of the journaling and horizontal tube assembly having a second embodiment torque equalizer spacers.

Seen in FIG. 10C is another alternate embodiment for torque equalizer assembly 320. Torque equalizer assembly 340 comprises welding 342, and torque spacers 344 that are positioned in between each interior wall of journaling tube assembly 80 and each respective exterior wall of horizontal tube assembly 20 to keep each interior wall of journaling tube assembly 20 at and approximate equivalent distance to its respective exterior wall of horizontal tube assembly 20. Torque equalizer assembly 340 also allows for torque distribution on the outside corners of horizontal tube assembly 20.

Furthermore, as best seen in FIGS. 10A, 10B, and 10C journaling tube assembly 80 also comprises a power transfer bolt 96 bolted through horizontal tube assembly 20, journaling tube assembly 80 and threaded internal horizontal tube 100. Power transfer bolt 96, mounted to threaded hole 94 of rear wall 92, journals within elongated horizontal channel 46 that extends between ends 22 and 24 when journaling tube assembly 80 journals upon horizontal tube assembly 20. In addition, grease-fitting 144 may receive a lubricant, such as grease therethrough, and through grease channel 146. Additional grease fittings may of course be installed if required.

In operation, journaling tube assembly 80 journals upon horizontal tube assembly 20 when activated by adjustable means, either electrically as seen in FIG. 1 with motor assembly 260, or mechanically as seen in FIG. 7 with crank assembly 280. In addition, ball assembly 180 may be adjusted forward and backward with elongation tubes 118 and 124. Another benefit to instant invention 10 is that it may be disassembled for maintenance or repair if required.

In one method of use, instant invention 10 is mounted upon any vehicle capable of towing a trailer assembly. After backing-up a vehicle, being a tow vehicle, within the proximity of a trailer assembly, trailer ball 188 is positioned laterally until aligned with the trailer's hitch ball coupler. Elongation tubes 118 and 124 can be extracted and positioned until trailer ball 188 is directly beneath the trailer's hitch ball coupler. The trailer is then lowered until trailer ball 188 is within the trailer's hitch ball coupler and locked/latched. The vehicle may then be moved backwardly until locking plunger 112 latches into and fills plunger holes 122. Safety-locking pin 130 is then inserted into pinholes 126. The user may then operate switch 400 or remote control 500 to actuate motor assembly 260 to cause journaling tube assembly 80 to journal, and therefore trailer ball 188, to the center of horizontal tube assembly 20, until spring-loaded center plunger assembly 140 having handle 142 latches into and fills center plunger hole 106.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A variably adjustable trailer hitch assembly, comprising:
A) a horizontal tube assembly fixedly secured onto a vehicle;
B) a journaling tube assembly that is mounted upon and journals said horizontal tube assembly;
C) a ball assembly mounted onto said journaling tube assembly, said ball assembly receives a trailer hitch ball coupler;
D) adjustable means to laterally move said journaling tube assembly mounted upon said horizontal tube assembly; and
E) a torque equalizer assembly having equalizing means to distribute torque distribution on opposing sides of each corner of said horizontal tube assembly.

2. The variably adjustable trailer hitch assembly set forth in claim 1, further characterized in that said horizontal tube assembly comprises a threaded power transfer rod extending therethrough and from said adjustable means to laterally move said journaling tube assembly mounted upon said horizontal tube assembly.

3. The variably adjustable trailer hitch assembly set forth in claim 2, further characterized in that said journaling tube assembly comprises a threaded internal horizontal tube that receives and cooperates with said threaded power transfer rod to allow said journaling tube assembly to journal upon said horizontal tube assembly when activated by said adjustable means.

4. The variably adjustable trailer hitch assembly set forth in claim 2, further characterized in that said adjustable means to laterally move said journaling tube assembly mounted upon said horizontal tube assembly comprises a motor assembly having a motor with rotating means to rotate said threaded power transfer rod clockwise and counter-clockwise.

5. The variably adjustable trailer hitch assembly set forth in claim 2, further characterized in that said adjustable means to laterally move said journaling tube assembly mounted upon said horizontal tube assembly comprises a manual crank assembly to rotate said threaded power transfer rod clockwise and counter-clockwise.

6. The variably adjustable trailer hitch assembly set forth in claim 1, further characterized in that each said equalizing means keep each interior wall of said journaling tube assembly at an approximate equivalent distance to a respective exterior wall of said horizontal tube assembly.

7. The variably adjustable trailer hitch assembly set forth in claim 6, further characterized in that said torque equalizer assembly comprises adjustable torque equalizers, each of said adjustable torque equalizers has a threaded end cap that places a predetermined force upon a respective thrust insert housed therein to adjust and keep each said interior wall of said journaling tube assembly at said approximate equivalent distance to said respective exterior wall of said horizontal tube assembly.

8. The variably adjustable trailer hitch assembly set forth in claim 6, further characterized in that said torque equalizer assembly comprises stationary welded torque equalizers that place a predetermined force to keep each said interior wall of said journaling tube assembly at said approximate equivalent distance to said respective exterior wall of said horizontal tube assembly.

9. The variably adjustable trailer hitch assembly set forth in claim 6, further characterized in that said torque equalizer assembly has torque spacers positioned in between each said interior wall of said journaling tube assembly and each said respective exterior wall of said horizontal tube assembly to keep each said interior wall of said journaling tube assembly at said approximate equivalent distance to said respective exterior wall of said horizontal tube assembly.

10. The variably adjustable trailer hitch assembly set forth in claim 1, further characterized in that said horizontal tube assembly comprises first and second ends and an elongated horizontal channel extended between said first and second ends.

11. The variably adjustable trailer hitch assembly set forth in claim 10, further characterized in that said journaling tube assembly further comprises a power transfer bolt bolted through said horizontal tube assembly, said journaling tube assembly, and a threaded internal horizontal tube, said power transfer bolt journals within said elongated horizontal channel extended between said first and second ends when said journaling tube assembly journals upon said horizontal tube assembly.

12. The variably adjustable trailer hitch assembly set forth in claim 1, further characterized in that said journaling tube assembly comprises at least one center plunger hole.

13. The variably adjustable trailer hitch assembly set forth in claim 12, further characterized in that said journaling tube assembly further comprises at least one center plunger that aligns with and fills said at least one center plunger hole when said journaling tube assembly is centrally positioned on said horizontal tube assembly.

14. The variably adjustable trailer hitch assembly set forth in claim 1, further characterized in that said journaling tube assembly further comprises a housing mounted thereon, said housing is approximately perpendicular to said horizontal tube assembly.

15. The variably adjustable trailer hitch assembly set forth in claim 14, further characterized in that said housing houses at least one elongation tube that attaches to said ball assembly, said elongation tube having positioning means to position said ball assembly at a desired distance from said housing.

16. The variably adjustable trailer hitch assembly set forth in claim 15, further characterized in that said housing comprises at least one center plunger hole.

17. The variably adjustable trailer hitch assembly set forth in claim 16, further characterized in that said housing further comprises at least one center plunger that aligns with and fills said at least one center plunger hole when said ball assembly is at said desired distance from said housing.

18. The variably adjustable trailer hitch assembly set forth in claim 15, further characterized in that said ball assembly mounts onto said at least one elongation tube.

19. The variably adjustable trailer hitch assembly set forth in claim 1, further characterized in that said horizontal tube assembly comprises bellows on each side of said journaling tube assembly.

20. The variably adjustable trailer hitch assembly set forth in claim 1, further characterized in that said horizontal tube assembly is mounted onto a frame bracket assembly that is secured onto said vehicle.

* * * * *